(12) United States Patent
Zones

(10) Patent No.: US 10,246,339 B2
(45) Date of Patent: Apr. 2, 2019

(54) CRYSTALLINE MOLECULAR SIEVES AND SYNTHESIS THEREOF

(71) Applicant: Chevron U.S.A. Inc., San Ramon, CA (US)

(72) Inventor: Stacey Ian Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 77 days.

(21) Appl. No.: 15/649,032

(22) Filed: Jul. 13, 2017

(65) Prior Publication Data

US 2017/0305752 A1 Oct. 26, 2017

Related U.S. Application Data

(62) Division of application No. 15/215,657, filed on Jul. 21, 2016, now Pat. No. 9,738,537.

(60) Provisional application No. 62/195,826, filed on Jul. 23, 2015.

(51) Int. Cl.

| | | |
|---|---|---|
| *C01B 39/04* | (2006.01) | |
| *C10G 47/02* | (2006.01) | |
| *B01J 20/18* | (2006.01) | |
| *B01J 20/30* | (2006.01) | |
| *B01J 29/04* | (2006.01) | |
| *B01J 29/18* | (2006.01) | |
| *B01J 29/70* | (2006.01) | |
| *B01J 29/86* | (2006.01) | |
| *B01J 39/14* | (2006.01) | |
| *C01B 39/00* | (2006.01) | |
| *C01B 39/26* | (2006.01) | |
| *C01B 39/48* | (2006.01) | |
| *C01B 37/02* | (2006.01) | |
| *C01B 39/12* | (2006.01) | |

(52) U.S. Cl.
CPC ............... *C01B 39/04* (2013.01); *B01J 20/18* (2013.01); *B01J 20/3057* (2013.01); *B01J 29/041* (2013.01); *B01J 29/047* (2013.01); *B01J 29/18* (2013.01); *B01J 29/70* (2013.01); *B01J 29/86* (2013.01); *B01J 39/14* (2013.01); *C01B 37/02* (2013.01); *C01B 39/00* (2013.01); *C01B 39/12* (2013.01); *C01B 39/265* (2013.01); *C01B 39/48* (2013.01)

(58) Field of Classification Search
None
See application file for complete search history.

(56) References Cited

U.S. PATENT DOCUMENTS 6,156,290 A 12/2000 Lee et al.
6,348,183 B2 2/2002 Lee et al.

OTHER PUBLICATIONS

S.I. Zones and S-J.HWANG "Synthesis of High Silica Zeolites Using a Mixed Quaternary Ammonium Cation, Amine Approach: Discovery of Zeolite SSZ-47" Chem. Mater. 2002, 14, 313-320.

*Primary Examiner* — Yun Qian
(74) *Attorney, Agent, or Firm* — Terrence M. Flaherty

(57) ABSTRACT

Crystalline molecular sieves and their synthesis using quaternary N-methyl-diisoalkylammonium cations as organic structure directing agents are disclosed. The structure directing agent has the following structure (1):

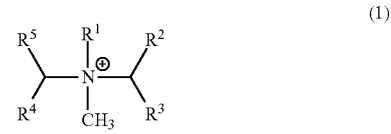

(1)

in which $R^1$ is selected from hydrogen, a methyl group, an ethyl group, a propyl group, and a hydroxymethyl group; and $R^2$, $R^3$, $R^4$ and $R^5$ are independently selected from a methyl group, an ethyl group, and a propyl group.

5 Claims, No Drawings

CRYSTALLINE MOLECULAR SIEVES AND SYNTHESIS THEREOF

CROSS-REFERENCE TO RELATED APPLICATIONS

This application is a divisional application of pending U.S. patent application Ser. No. 15/215,657, filed Jul. 21, 2016 which claims priority to and the benefit of U.S. patent application Ser. No. 62/195,826, filed Jul. 23, 2015, the disclosures of which are fully incorporated herein by reference in their entireties.

TECHNICAL FIELD

This disclosure relates generally crystalline molecular sieves and their synthesis using quaternary N-methyl-di-isoalkylammonium cations as organic structure directing agents.

BACKGROUND

Zeolites and zeolite-like materials are porous crystalline materials made of tetrahedral or octahedral oxide building blocks, linked together through tetrahedral or octahedral corner oxygen atoms. There are many ways in which the tetrahedral or octahedral building blocks may link to form polynuclear complex structures, having different topologies. In some structures, the building blocks link to form infinite chains, forming fibrous needle-like crystals. In other structures, the building blocks are linked in layers or sheets. In yet other structures, the building blocks are linked in three dimensions with mutual sharing of oxygen atoms, thereby forming a framework structure containing void spaces, such as channels (pores) and cavities. The chemical composition of zeolites and zeolite-like materials as well as the nature of the void space and the interconnecting channels are responsible for the catalytic and shape-selective properties of each zeolite or zeolite-like structure. Zeolites and zeolite-like materials can have channels that may or may not intersect with each other. When the channels intersect with each other, the channel intersections may form cavities within the crystal structure. Many natural and synthetic zeolites or zeolite-like materials with distinct crystal structures are currently known and are recognizable by distinct and characteristic X-ray diffraction patterns.

Zeolites and zeolite-type materials are used as sorbents and/or catalysts in many commercial processes, particularly in petroleum refining and petrochemical processes.

Typically, synthetic zeolite and zeolite-like molecular sieves are prepared by crystallization of an aqueous reaction mixture containing sources of the desired inorganic oxide building blocks and an organic structure directing (templating) agent, such as a nitrogen-containing compound. By varying the synthesis conditions, zeolite or zeolite-like structures of many kinds can be prepared. While each element of the synthesis may have an influence on the type of structure that crystallizes, the organic structure directing agent often plays an important role in defining the types and sizes of the channels and cavities in the resultant crystalline products. However, the type of crystal structure that might be obtained from a given synthesis mixture with any given organic structure directing agent is currently unpredictable. Many different kinds of amines and ammonium compounds have thus been reported to be suitable organic structure directing agents for various crystalline molecular sieve structures.

There is thus a continuing need to find new organic structure directing agents suitable for the synthesis of zeolites or zeolite-like materials.

SUMMARY

In one aspect, there is provided a method for preparing a crystalline molecular sieve having a three-dimensional framework comprising oxides of one or more tetravalent element(s), optionally one or more trivalent element(s), and optionally one or more pentavalent element(s), the method comprising subjecting to crystallization conditions one or more sources of the oxides in the presence of hydroxide ions or fluoride ions; water; and at least one structure directing agent of structure (1):

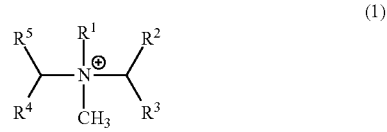

in which $R^1$ is selected from hydrogen, a methyl group, an ethyl group, a propyl group, and a hydroxymethyl group; and $R^2$, $R^3$, $R^4$ and $R^5$ are independently selected from a methyl group, an ethyl group, and a propyl group.

In another aspect, there is provided a crystalline molecular sieve containing within its pore structure a structure directing agent of structure (1):

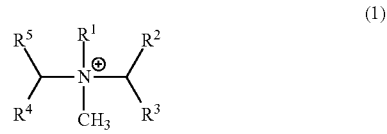

in which $R^1$ is selected from hydrogen, a methyl group, an ethyl group, a propyl group, and a hydroxymethyl group; and $R^2$, $R^3$, $R^4$ and $R^5$ are independently selected from a methyl group, an ethyl group, and a propyl group.

This disclosure is applicable to synthesis of broad range of molecular sieve types, and is particularly suitable for preparing molecular sieves having the *BEA framework type, the BEC framework type, the DDR framework type, the EUO framework type, the MOR framework type, the NON framework type, the STF framework type, the framework type of SSZ-36, the framework type of SSZ-45, the framework type of SSZ-47, the framework type of SSZ-99, or any combination of these framework types.

The molecular sieve may have a three-dimensional framework consisting essentially of silicon oxide, a three-dimensional framework comprising oxides of silicon and germanium, a three-dimensional framework comprising oxides of silicon and boron, or a three-dimensional framework comprising oxides of silicon and aluminum.

In a further aspect, there is provided a crystalline molecular sieve, wherein the molecular sieve has a framework type of SSZ-47 and a three-dimensional framework comprising oxides of silicon and aluminum, which comprises within its pore structure N,N-dimethyl-di-sec-butylammonium cations. The molecular sieve can be synthesized by subjecting to crystallization conditions one or more sources of oxides of silicon and aluminum in the presence of fluoride ions, water, and N,N-dimethyl-di-sec-butylammonium cations.

DETAILED DESCRIPTION

The present disclosure relates to a method for preparing zeolites and zeolite-like molecular sieves.

As used herein, the terms "zeolite" and "zeolite-like" and "molecular sieve" refer to microporous crystalline materials having a fixed, open-network structure, made of oxides of one or more tetravalent element(s), optionally one or more trivalent element(s), optionally one or more pentavalent element(s). The tetravalent element may be selected from the group consisting of silicon, germanium, and combinations thereof. The trivalent element may be selected from boron, aluminum, gallium, indium, chromium, iron, and combinations thereof. In an embodiment, the trivalent element is aluminum. Conveniently, the pentavalent element is phosphorus. Zeolites and zeolite-type materials thus include silicates, aluminates, silicoaluminates, aluminosilicates, aluminophosphates, silicoaluminophosphates, as well as metal-substituted forms thereof, including molecular sieves in which metal substitution is partial or complete, and including molecular sieves in which metal substitution has occurred during crystallization of the molecular sieve or after crystallization of the molecular sieve (post-synthesis).

In particular, the present disclosure relates to a method for preparing zeolites or zeolite-like molecular sieves using a quaternary N-methyl-diisoalkylammonium compound as a structure directing agent ("SDA"), also known as a crystallization template. The SDA is represented by the following structure (1):

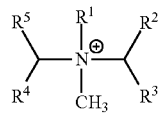

(1)

in which $R^1$ is selected from hydrogen, a methyl group, an ethyl group, a propyl group, and a hydroxymethyl group; and $R^2$, $R^3$, $R^4$ and $R^5$ are independently selected from a methyl group, an ethyl group, and a propyl group.

Examples of compounds of structure (1) include N-methyl-diisopropylammonium cations, N,N-dimethyl-diisopropylammonium cations, N-ethyl-N-methyl-diisopropylammonium cations, N-methyl-triisopropylammonium cations, N-hydroxmethyl-N-methyl-diisopropylammonium cations, N-methyl-di-sec-butylammonium cations, and N,N-dimethyl-di-sec-butylammonium cations.

In one embodiment, the structure directing agent is selected from N,N-dimethyl-diisopropylammonium cations, N-ethyl-N-methyl-diisopropylammonium cations, N-hydroxmethyl-N-methyl-diisopropylammonium cations, and N,N-dimethyl-diisobutylammonium cations.

In an embodiment in which the molecular sieve has a three-dimensional framework comprising oxides of silicon and germanium, the molecular sieve is prepared in the absence of N,N-dimethyl-diisopropylammonium cations.

The SDA cation is associated with anions which can be any anion that is not detrimental to the formation of the molecular sieve. Representative anions include elements from Group 17 of the Periodic Table (e.g., fluoride, chloride, bromide, and iodide), hydroxide, sulfate, tetrafluoroborate, acetate, carboxylate, and the like. As used herein, the numbering scheme for the Periodic Table Groups is as disclosed in Chem. Eng. News, 63(5), 26-27 (1985).

The compounds of structure (1) are either commercially available or can be easily prepared by methods known in the art, for example, by reacting the corresponding amines with an appropriate alkylating agent.

The molecular sieves disclosed herein are typically prepared by crystallization of an aqueous reaction mixture containing sources of the desired inorganic oxide building blocks and at least one structure directing agent of structure (1), as defined above.

In an embodiment, the composition of the reaction mixture from which the molecular sieve is formed, in terms of mole ratios, is identified in Table 1 below:

TABLE 1

| | Broad | Exemplary |
|---|---|---|
| $SiO_2/GeO_2$ | 1 to 100 | 1 to 10 |
| $Q/(SiO_2 + GeO_2)$ | 0.10 to 1.0 | 0.15 to 0.40 |
| $F/(SiO_2 + GeO_2)$ | 0.05 to 1.0 | 0.30 to 0.60 |
| $H_2O/(SiO_2 + GeO_2)$ | 1 to 40 | 3 to 20 | in which Q is at least one organic structure directing agent of structure (1), as defined above.

In an embodiment, the composition of the reaction mixture from which the molecular sieve is formed, in terms of mole ratios, is identified in Table 2 below:

TABLE 2

| | Broad | Exemplary |
|---|---|---|
| $SiO_2/X_2O_3$ | ≥5 | 5 to 200 |
| $Q/SiO_2$ | 0.10 to 1.0 | 0.15 to 0.40 |
| $F/SiO_2$ | 0.2 to 1.5 | 0.30 to 0.60 |
| $H_2O/SiO_2$ | 1 to 10 | 2 to 10 | in which X is a trivalent element selected from the group consisting of boron, aluminum, and combinations thereof; and Q is at least one organic structure directing agent of structure (1), as defined above. It should be noted that a $SiO_2/X_2O_3$ mole ratio of ≥5 includes the case where there is no $X_2O_3$. In that case, the resultant molecular sieve is comprised of essentially all of oxides of silicon.

In an embodiment, the composition of the reaction mixture from which the molecular sieve is formed, in terms of mole ratios, is identified in Table 3 below:

TABLE 3

| | Broad | Exemplary |
|---|---|---|
| $SiO_2/Al_2O_3$ | 5 to 200 | 5 to 100 |
| $Q/SiO_2$ | 0.10 to 1.0 | 0.15 to 0.40 |
| $M/SiO_2$ | 0.05 to 1.0 | 0.20 tom 0.60 |
| $OH/SiO_2$ | 0.10 to 1.0 | 0.25 to 0.80 |
| $H_2O/SiO_2$ | 10 to 100 | 20 to 50 | in which Q is at least one organic structure directing agent of structure (1), as defined above; and M is selected from the group consisting of elements from Groups 1 and 2 of the Periodic Table of Elements. Any M-containing compound which is not detrimental to the crystallization process is suitable. Sources for such Groups 1 and 2 elements include oxides, hydroxides, halides, nitrates, sulfates, acetates, oxalates, and citrates thereof.

When the tetravalent element is silicon, suitable sources of silicon oxide include fumed silica, precipitated silicates, silica hydrogel, silicic acid, colloidal silica, tetra-alkyl orthosilicates (e.g., tetraethyl orthosilicate), and silica hydroxides. When the tetravalent element is germanium, suitable sources of germanium include germanium oxide, germanium ethoxide and tetraethyl orthogermanate.

When a trivalent element is used and the trivalent element is boron, suitable sources of boron oxide include borosilicate glasses, alkali-metal borates, boric acid, borate esters, and certain zeolites. When a trivalent element is used and the trivalent element is aluminum, suitable sources of aluminum oxide include aluminates, alumina, and aluminum compounds such as $AlCl_3$, $Al_2(SO_4)_3$, $Al(OH)_3$, kaolin clays, and other zeolites. An example of the source of aluminum oxide is LZ-210 (a type of Y zeolite). Sources of trivalent elements gallium, indium, chromium, and iron include, for example, oxide, hydroxide, nitrate, sulfate, acetate, oxalate, and ammonium salts thereof.

Suitable sources of fluoride ions include hydrogen fluoride, ammonium fluoride and ammonium hydrogen difluoride.

The method disclosed herein is suitable for preparing a wide range of molecular sieve structures. Non-limiting examples include molecular sieves having the *BEA framework type, the BEC framework type, the DDR framework type, the EUO framework type, the MOR framework type, the NON framework type, the STF framework type, the framework type of SSZ-36, the framework type of SSZ-45, the framework type of SSZ-47, the framework type of SSZ-99, or any combination of these framework types. As used herein, the term "framework type" is used in the sense described in the "*Atlas of Zeolite Framework Types*," Sixth Revised Edition, Elsevier, 2007.

SSZ-36 is an intergrowth of ITE/RTH framework type molecular sieves. SSZ-45 has been assigned the framework type EEI by the Structure Commission of the International Zeolite Association. The framework structure of SSZ-45 is closely related to those of nonasil (NON), EU-1 (EUO) and NU-87 (NES). SSZ-47 also belongs in the structural group NON/EUO/NES.

The crystalline molecular sieves disclosed herein are crystallized from an aqueous solution comprising at least structure directing agent of structure (1) as defined above, at least one oxide capable of forming the desired molecular sieve structure, and optionally at least one source of fluoride ions and/or hydroxide ions. One skilled in the art will appreciate that a wide range of reaction mixture compositions and crystallization conditions can be used, depending on the molecular sieve crystal structure that one wishes to crystallize. Crystallization can be carried out under either static, tumbled or stirred conditions in a suitable reactor vessel, such as for example, polypropylene jars or Teflon-lined stainless steel autoclaves, typically at a temperature of from 135° C. to 200° C. for a time sufficient for crystallization to occur. Formation of the crystalline product may take anywhere from 30 minutes up to 4 weeks (e.g., from 1 hour to 10 days). The crystallization time depends on the type of structure formed and the temperature employed, with higher temperatures typically requiring shorter hydrothermal treatments.

Crystallization can be facilitated by the presence of at least 10 ppm (e.g., at least 100 ppm, at least 500 ppm, or at least 1000 ppm) of seed crystals based on the total weight of the reaction mixture. If present, it is preferable that the amount of seed crystals does not exceed 3% of the weight of the total weight of the reaction mixture. The seed crystals can be iso-structural with the desired molecular sieve, for example the product of a previous synthesis, or can be a hetero-structural crystalline material.

Typically, the crystalline product is formed in solution and can be recovered by standard means, such as by centrifugation or filtration. The separated product can also be washed, recovered by centrifugation or filtration and dried, typically at a temperature of less than 200° C.

As a result of the crystallization process, the recovered crystalline product contains within its pores at least a portion of the structure directing agent used in the synthesis. Accordingly, the present disclosure also relates to a crystalline molecular sieve, comprising a structure directing agent of structure (1), as previously defined. The organic structure directing agent, and the fluoride component, if used in the synthesis mixture, which are associated with the material as a result of their presence during crystallization, are typically at least partially removed from the molecular sieve by calcination before use, leaving active catalytic sites within the microporous channels and cavities of the molecular sieve open for contact with a feedstock. Calcination consists essentially of heating the molecular sieve comprising the SDA at a temperature of from 200° C. to 800° C. in the presence of an oxygen-containing gas, optionally in the presence of steam. In some cases, it may be desirable to heat the molecular sieve in an environment having a low or zero oxygen concentration, at least for a portion of the calcination process. The molecular sieve crystallites obtained after crystallization may be in the form of single crystals or agglomerates.

To the extent desired and depending on the composition of the material, any cations in the as-synthesized material can be replaced in accordance with techniques well known in the art, at least in part, by ion exchange with other cations. Preferred replacing cations include metal ions, hydrogen ions, hydrogen precursor, e.g., ammonium ions, or mixtures thereof. Particularly preferred cations are those which tailor the catalytic activity for certain hydrocarbon conversion reactions. These include hydrogen, rare earth metals and metals of Groups 2-15 of the Periodic Table of Elements. As used herein, the term "as-synthesized" refers to the molecular sieve in its form after crystallization, prior to removal of the SDA cation.

Once the crystalline molecular sieve has been synthesized, it can be formulated into a catalyst composition by combination with other materials, such as binders and/or matrix materials, which provide additional hardness or catalytic activity to the finished catalyst.

The crystalline molecular sieves described herein may be used to dry gases and liquids; for selective molecular separation based on size and polar properties; as ion-exchangers; and as catalysts, for example, in hydrocarbon conversion reactions and in the reduction of oxides of nitrogen in gas streams.

EXAMPLES

The following illustrative examples are intended to be non-limiting.

Examples 1-4

Germanosilicate Synthesis in Fluoride Media 1.5 mmoles of SDA in the hydroxide form was mixed with 0.52 g of tetraethyl orthosilicate and 0.12 g of tetraethyl orthogermanate in a Teflon-lined Parr reactor (23 mL). The reactor was sealed for 2-3 days and then opened to evaporate off the ethanol produced. Once the $H_2O/(SiO_2+GeO_2)$ mole ratio=5, 1.5 mmoles of HF (50%) was added to the reactor. The reactor was then sealed and heated in a convection oven at 150° C. with tumbling of the reactor (43 rpm). The reaction progress was monitored by Scanning Electron Microscopy (SEM) in 6 day increments. Upon crystallization, the solid products were recovered, washed with deionized water and dried. The products were then characterized by powder X-ray diffraction.

Table 4 below shows the results obtained with several different quaternary N-methyl-diisoalkylammonium structure directing agents.

TABLE 4

| Example | SDA Cation | Product |
|---|---|---|
| 1 | N,N-dimethyl-diisopropylammonium | AST |
| 2 | N-ethyl-N-methyl-diisopropylammonium | BEC |
| 3 | N-hydroxymethyl-N-methyl-diisopropylammonium | Unknown |
| 4 | N,N-dimethyl-di-sec-butylammonium | BEC |

Examples 5-8

All-Silica Synthesis in Fluoride Media

Example 1 was repeated with the exception that no tetraethyl orthogermanate was added to the reaction mixture.

Table 5 below shows the results obtained with several different quaternary N-methyl-diisoalkylammonium structure directing agents.

TABLE 5

| Example | SDA Cation | Product |
|---|---|---|
| 5 | N,N-dimethyl-diisopropylammonium | NON |
| 6 | N-ethyl-N-methyl-diisopropylammonium | SSZ-35 (STF) |
| 7 | N-hydroxymethyl-N-methyl-diisopropylammonium | NON |
| 8 | N,N-dimethyl-di-sec-butylammonium | *BEA |

Examples 9-12

Germanosilicate Synthesis in the Absence of Fluoride Ions

Example 1 was repeated with the exception that no HF was added to the reaction mixture.

Table 6 below shows the results obtained with several different quaternary N-methyl-diisoalkylammonium structure directing agents.

TABLE 6

| Example | SDA Cation | Product |
|---|---|---|
| 9 | N,N-dimethyl-diisopropylammonium | BEC |
| 10 | N-ethyl-N-methyl-diisopropylammonium | Quartz |
| 11 | N-hydroxymethyl-N-methyl-diisopropylammoniun | No Product |
| 12 | N,N-dimethyl-di-sec-butylammonium | No Product |

Examples 13-16

Aluminosilicate Synthesis in Fluoride Media

Example 1 was repeated with the exception that tetraethyl orthogermanate was replaced with 0.04 g of a partially dealuminated Y zeolite (LZ-210) and that the synthesis was conducted at 160° C. instead of 150° C.

Table 7 below shows the results obtained with several different quaternary N-methyl-diisoalkylammonium structure directing agents.

TABLE 7

| Example | SDA Cation | Product |
|---|---|---|
| 13 | N,N-dimethyl-diisopropylammonium | DDR |
| 14 | N-ethyl-N-methyl-diisopropylammonium | SSZ-35 (STF) |
| 15 | N-hydroxymethyl-N-methyl-diisopropylammonium | No Product |
| 16 | N,N-dimethyl-di-sec-butylammonium | SSZ-45/47 type |

Examples 17-20

Borosilicate Synthesis in Fluoride Media 1.5 mmoles of SDA in the hydroxide form was added to a Teflon-lined Parr reactor (23 mL). Then, 1.05 g of tetraethyl orthosilicate was added to the reactor followed by 0.04 g of boric acid and 0.05 g of ammonium fluoride. The reactor was sealed for 2-3 days and then opened to evaporate off the ethanol produced. The reactor was then sealed and heated in a convection oven at 160° C. with tumbling of the reactor (43 rpm). The reaction progress was monitored by Scanning Electron Microscopy (SEM) in 6 day increments. Upon crystallization, the solid products were recovered, washed with deionized water and dried. The products were then characterized by powder X-ray diffraction.

Table 8 below shows the results obtained with several quaternary N-methyl-diisoalkylammonium structure directing agents.

TABLE 8

| Example | SDA Cation | Product |
|---|---|---|
| 17 | N,N-dimethyl-diisopropylammonium | DDR |
| 18 | N-ethyl-N-methyl-diisopropylammonium | SSZ-36 |
| 19 | N-hydroxymethyl-N-methyl-diisopropylammonium | No Product |
| 20 | N,N-dimethyl-di-sec-butylammonium | EUO |

Examples 21-24

Aluminosilicate Synthesis in Hydroxide Media 2 mmoles of SDA was added to a Teflon-lined Parr reactor (23 mL) containing a solution with 2 mmol of NaOH, 2 g of sodium silicate (38-39%), 2 g of water and 0.28 g of Y zeolite (CBV300, Zeolyst International, $SiO_2/Al_2O_3$ mole ratio=5.1) as the source of aluminum. The reaction mixture had a $H_2O/SiO_2$ mole ratio of about 30. The reactor was then sealed and heated in a convection oven at 135° C. with tumbling of the reactor (43 rpm). The reaction progress was monitored by Scanning Electron Microscopy (SEM) in 6 day increments. Upon crystallization, the solid products were recovered, washed with deionized water and dried. The products were then characterized by powder X-ray diffraction.

Table 9 below shows the results obtained with several quaternary N-methyl-diisoalkylammonium structure directing agents.

TABLE 9

| Example | SDA Cation | Product |
|---|---|---|
| 21 | N,N-dimethyl-diisopropylammonium | ANA |
| 22 | N-ethyl-N-methyl-diisopropylammonium | SSZ-99 |
| 23 | N-hydroxymethyl-N-methyl-diisopropylammonium | MOR |
| 24 | N,N-dimethyl-di-sec-butylammonium | ANA |

The invention claimed is:

1. A crystalline molecular sieve, wherein the molecular sieve has a framework of SSZ-47 and the three-dimensional framework comprising oxides of silicon and aluminum, comprising within its pore structure N,N-dimethyl-di-sec-butylammonium cation.

2. A method of synthesizing the crystalline molecular sieve of claim 1, the method comprising subjecting to crystallization conditions one or more sources of oxides silicon and aluminum in the presence of fluoride ions, water, and N,N-dimethyl-di-sec-butylammonium cations.

3. The method of claim 2, wherein the molecular sieve is formed from a reaction mixture having the composition, in terms of mole ratios, as follows:

| | |
|---|---|
| $SiO_2/Al_2O_3$ | ≤5 |
| $Q/SiO_2$ | 0.10 to 1.0 |
| $F/SiO_2$ | 0.2 to 1.5 |
| $H_2O/SiO_2$ | 1 to 10 | wherein Q comprises N,N-dimethyl-di-sec-butylammonium cations.

4. The method of claim 2, wherein the molecular sieve is formed from a reaction mixture having the composition, in terms of mole ratios, as follows:

| | |
|---|---|
| $SiO_2/Al_2O_3$ | 5 to 200 |
| $Q/SiO_2$ | 0.15 to 0.40 |
| $F/SiO_2$ | 0.30 to 0.60 |
| $H_2O/SiO_2$ | 2 to 10 | wherein Q comprises N,N-dimethyl-di-sec-butylammonium cations.

5. The method of claim 2, wherein the crystallization conditions include a temperature of from 135° C. to 200° C.

* * * * *